(12) United States Patent
Feuerecker

(10) Patent No.: US 7,003,975 B2
(45) Date of Patent: Feb. 28, 2006

(54) HEATING/COOLING CIRCUIT FOR AN AIR-CONDITIONING SYSTEM OF A MOTOR VEHICLE, AIR-CONDITIONING SYSTEM AND A METHOD FOR CONTROLLING THE SAME

(75) Inventor: Günther Feuerecker, Stuttgart (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 10/476,023

(22) PCT Filed: Jan. 13, 2003

(86) PCT No.: PCT/EP03/00228

§ 371 (c)(1),
(2), (4) Date: Oct. 27, 2003

(87) PCT Pub. No.: WO03/057518

PCT Pub. Date: Jul. 17, 2003

(65) Prior Publication Data

US 2004/0129012 A1   Jul. 8, 2004

(30) Foreign Application Priority Data

Jan. 14, 2002 (DE) ............................... 102 01 207
Jan. 15, 2002 (DE) ............................... 102 01 408

(51) Int. Cl.
*F25B 47/00* (2006.01)
*F25B 13/00* (2006.01)

(52) U.S. Cl. ..................................... 62/324.5; 62/278

(58) Field of Classification Search .................. 62/150, 62/151, 324.5, 324.1, 278, 239, 244
See application file for complete search history.

(56) References Cited

U.S. PATENT DOCUMENTS

| 4,974,418 A | 12/1990 | Levine et al. |
| 6,212,900 B1 | 4/2001 | Iritani et al. |
| 6,314,750 B1 | 11/2001 | Ishikawa et al. |
| 2001/0003311 A1 | 6/2001 | Karl |

FOREIGN PATENT DOCUMENTS

| DE | 196 44 583 A1 | 4/1998 |
| DE | 197 52 133 A1 | 6/1998 |
| EP | 0 788 910 A2 | 8/1997 |
| JP | 4-278153 A | 10/1992 |
| JP | 5-77636 A | 3/1993 |

*Primary Examiner*—Chen Wen Jiang
(74) *Attorney, Agent, or Firm*—Foley & Lardner LLP

(57) ABSTRACT

The invention relates to a heating/cooling circuit for a motor vehicle comprising an evaporator (14) for cooling air to be fed into an interior space, a heat exchanger (16) for heating said air to be fed into the interior space, an external heat exchanger (22) comprising a compressor for transporting coolant, a first expansion organ (28), allocated to the evaporator (14), a second expansion organ (30), allocated to the external heat exchanger (22) and coolant conduits ($L_1$ to $L_{12}$), via which the aforementioned components are interconnected. The compressor (24), the external heat exchanger (22) and the second expansion organ (30) constitute a de-icing circuit of the inventive circuit.

24 Claims, 4 Drawing Sheets

HEATING/COOLING CIRCUIT FOR AN AIR-CONDITIONING SYSTEM OF A MOTOR VEHICLE, AIR-CONDITIONING SYSTEM AND A METHOD FOR CONTROLLING THE SAME

BACKGROUND OF THE INVENTION (1) Filed of the Invention

The invention relates to a heating/cooling circuit for a motor vehicle according to the preamble of claim 1, an air-conditioning system containing said heating/cooling circuit and a method for controlling the air-conditioning system.

(2) Description of Related Art

JP-A-4-278153 discloses a heating/cooling circuit for an air-conditioning system with a deicing mode, deicing being carried out by increasing the degree of opening of an expansion valve and by reducing the quantity of air supplied to an interior heat exchanger. In this case, since the degree of opening of the expansion valve is increased, both the interior heat exchanger and the exterior heat exchanger act as condensers. Furthermore, since the quantity of air supplied to the interior heat exchanger is reduced, the radiated heat quantity at the interior heat exchanger is reduced, and consequently the radiated heat at the exterior heat exchanger is increased correspondingly, with the result that the ice is melted, while the passenger compartment is further heated by the interior heat exchanger, albeit with a reduced maximum power.

JP-A-5-77636 discloses a heating/cooling circuit for an air-conditioning system with an interior heat exchanger which serves as a condenser and with an exterior heat exchanger which serves as an evaporator in a heating mode, in order to heat the passenger compartment. In a defrosting mode for the exterior heat exchanger, part of the refrigerant is transferred directly from a compressor to the exterior heat exchanger as a result of the opening of a bypass, in order thereby to bypass the interior heat exchanger and an expansion valve. In this way, the exterior heat exchanger acts as a condenser and the ice is melted by the condensation heat in the exterior heat exchanger. The heat capacity of the interior heat exchanger is thereby reduced.

In both of the Japanese publications mentioned above, the heat capacity of the interior heat exchanger is reduced, even though a reduction in the temperature in the passenger interior is minimized. In the case of a continuous operation of the air-conditioning system, the defrosting mode has only a slight influence, but, in an air-conditioning system of a motor vehicle which is operated, for example, for only one hour, a defrosting mode of, for example, 30 minutes has some effect, so that there is a certain reduction in temperature in the passenger compartment.

According to a heating/cooling circuit, disclosed in EP 0 788 910 A2, for an air-conditioning system in a motor vehicle, a delay mode is described, in which the deposition of ice on the exterior heat exchanger is delayed, with the result that the heating duration can be prolonged and a defrosting mode postponed.

Air-conditioning systems of this type still do not satisfy some requirements, particularly with regard to the duration of the defrosting mode.

SUMMARY OF THE INVENTION

The object of the invention is to avoid or at least reduce the abovementioned disadvantages and to provide an improved heating/cooling circuit for an air-conditioning system of a motor vehicle and also a method for controlling the air-conditioning system.

This object is achieved by means of a subject having the features of claim 1, an air-conditioning system having the features of claim 16 and a method as claimed in claim 17.

According to the invention, there is a heating/cooling circuit for a motor vehicle, with an evaporator for the cooling of air to be supplied to an interior, with a heating heat exchanger for heating the air to be supplied to the interior, with an exterior heat exchanger, with a compressor for the conveyance of refrigerant, with a first expansion member which is assigned to the evaporator, with a second expansion member which is assigned to the exterior heat exchanger, and with refrigerant lines, via which the abovementioned components are connected to one another, a defrosting connection of the circuit comprising the compressor, the exterior heat exchanger and the second expansion member. By means of a defrosting connection of this type, the refrigerant experiences first a pressure increase in the compressor and subsequently, if appropriate even before expansion, a discharge of heat in the iced-up exterior heat exchanger. In this case, the exterior heat exchanger is heated by the circulating refrigerant in the defrosting mode carried out by means of the defrosting connection. In this way, the iced-up exterior heat exchanger can be defrosted quickly, particularly when the engine cooling requirements cannot be satisfied by means of an air quantity which is reduced on account of icing-up.

Preferably, the second expansion member follows the compressor. In this case, preferably, the second expansion member precedes the exterior heat exchanger. Since the suction pressure is determined essentially by the coldest point in the defrosting circuit, in this case said suction pressure is determined by the iced-up exterior heat exchanger, so that it is possible to have a higher defrosting capacity than if the exterior heat exchanger were arranged upstream of the expansion member. For this purpose, in the defrosting mode, the refrigerant is compressed in the compressor, conducted to the expansion member, expands there and discharges its heat in the exterior heat exchanger, the heat melting ice which is located in the exterior heat exchanger.

Preferably, the second expansion member is controllable, in particular continuously, and can be activated electrically.

So that the capacities of the heat exchangers can be matched even more effectively to the demand, preferably the compressor power, too, can be controlled by the adjustment of the stroke volume or of the compressor rotational speed.

Preferably, a sensor is provided in the air upstream of the exterior heat exchanger, this sensor preferably determining the exterior temperature of the air. This may preferably be carried out directly upstream of the exterior heat exchanger, but also at any other points at which an exterior temperature changed substantially by influences cannot be measured, such as, for example, on the intake tract of the air-conditioning system. The sensor is preferably a temperature sensor.

Preferably, a sensor is provided in the refrigerant downstream of the exterior heat exchanger, in particular in the region located on the low-pressure side, that is to say anywhere between the outlet of the exterior heat exchanger, the outlet of the evaporator and the inlet into the compressor. This sensor may determine, for example, the temperature of the refrigerant. According to an alternative, the sensor may determine the pressure which is closely related to the temperature.

The heating/cooling circuit preferably comprises a control device which controls the heating/cooling circuit as a function of the temperatures determined by means of the temperature sensors, that is to say switches to the defrosting mode and/or back again to the normal mode, as required.

Preferably, $CO_2$ is used as refrigerant for the heating or cooling circuit according to the invention, since $CO_2$ is optimally suitable for a heat-pump mode, such as can be carried out by means of the circuit according to the invention. When $CO_2$ is used as refrigerant, preferably an internal heat exchanger is provided for the exchange of heat between a high-pressure-side and a low-pressure-side section of the heating/cooling circuit. The result of using $CO_2$ as refrigerant is that some of the operating points lie in supercritical states, so that the discharge of heat often takes place without condensation.

Preferably, a heating bypass line capable of being shut off is provided in the heating/cooling circuit for the refrigerant-side bypass of the heating heat exchanger. This line is opened by means of a valve which is open solely in the defrosting mode. The line supplies the expansion member with the refrigerant coming from the compressor.

In order to keep the refrigerant pressure losses between the lines and heat exchangers as low as possible and so that the optimal operating point according to the conditions can be set in the cooling or heating mode, a heating bypass line capable of being shut off is provided, for the refrigerant-side bypass of the heating heat exchanger and of the expansion member assigned to the exterior heat exchanger, and a cooling bypass line capable of being shut off is provided, for bypassing the evaporator and the associated expansion member. Furthermore, the evaporator or heating heat exchanger, as components, can thus be disconnected completely if their functioning is not required or would even be disadvantageous.

So that in the cooling mode, when only the evaporator is operating and cools the air to be supplied to the vehicle interior, no refrigerant accumulates in the heating heat exchanger, which is also necessarily cooled by the air cooled by the evaporator, since the air flows through said heating heat exchanger, a throttlable line is provided between a line connected to the heating heat exchanger and a line at the low pressure level of the evaporator.

The invention is explained in detail below by means of an exemplary embodiment, with reference to the drawing in which:

DETAILED DESCRIPTION OF PREFERRED EMBODIMENTS

Figure 1:
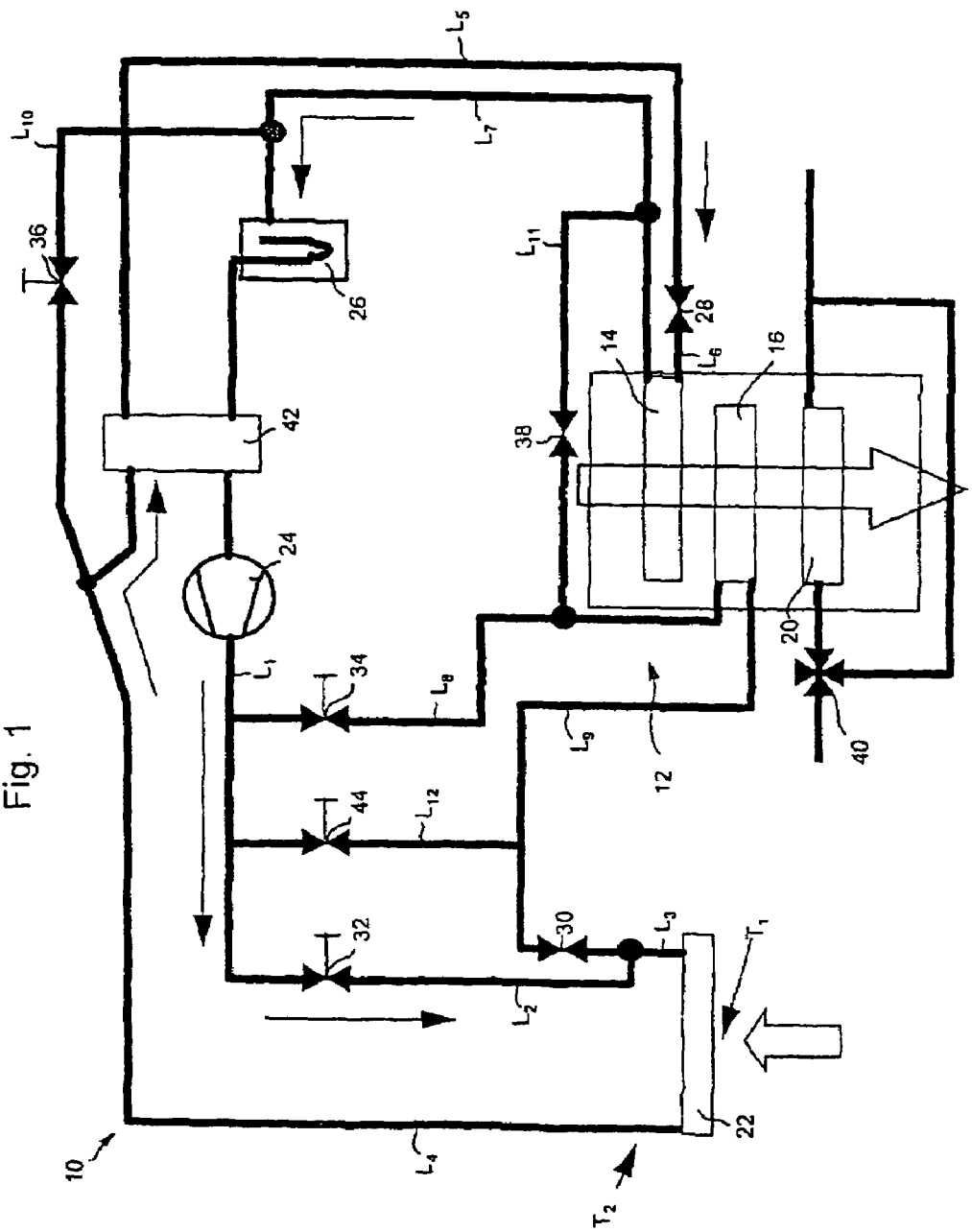
FIG. 1 shows a heating/cooling circuit according to the invention in the cooling operating mode.

A heating/cooling circuit 10 according to the invention for an air-conditioning system for a motor vehicle has an evaporator 14 arranged in an air-conditioning unit 12, which, as a rule, is arranged in an instrument panel of the motor vehicle, and a heating heat exchanger 16 following the evaporator 14 on the air side. Via a blower (not illustrated), circulating air or fresh air can be conveyed through the air-conditioning unit 12, as is illustrated by an arrow, in which case the air can be cooled in the evaporator 14 and heated in the heating heat exchanger 16.

Optionally, a further heating heat exchanger 20 is arranged upstream or downstream of the heating heat exchanger 16 on the air side and is connected via refrigerant lines K to an engine, not illustrated, of the motor vehicle, so that hot coolant can flow through the heating heat exchanger. The functioning of this heating heat exchanger 16 can be controlled, as required, for example, by means of a heating regulating valve 40 or else with the aid of flaps (not illustrated), by means of which the air is led in the desired ratio to the heating heat exchanger 16 or led past the latter. The air thermally controlled in the air-conditioning unit 12 can be supplied to the vehicle interior via suitable outflow devices.

In addition to the evaporator 14 and the heating heat exchanger 16, the heating/cooling circuit 10 has an exterior heat exchanger 22 and a compressor 24. These components of the heating/cooling circuit are connected to one another via refrigerant lines $L_1$ to $L_{12}$ in the way described below. A refrigerant collector 26 is provided in the line $L_7$ on the inlet side of the compressor 24.

The evaporator 14 is assigned on the inlet side a first expansion member 28 and the exterior heat exchanger 22 is assigned on the inlet side a further expansion member 30. The two expansion members 28 and 30 can be activated preferably electrically and can be controlled continuously. Furthermore, valves 32, 34, 36, 38, 40 and 44 are provided, the functions of which are described further below. The valves 32, 34, 36, 44 are switching valves which can be activated preferably electrically. The valve 38 is preferably a throttle. The valves 32, 34, 44 may also form a structural unit (what is known as a 4/3-way valve), in which case construction space and cost benefits may arise.

In the cooling mode (FIG. 1), that is to say when the air to be supplied to the vehicle interior is solely to be cooled, the heating/cooling circuit 10 is connected up as follows:

Starting from the compressor 24, the refrigerant is supplied to the exterior heat exchanger 22 by the lines $L_1$, $L_2$ and $L_3$. For this purpose, the valve 32 is opened and the valves 34 and 44 are closed. In the exterior heat exchanger 22, the refrigerant, taking the form of hot gas, is cooled. The refrigerant flows from the exterior heat exchanger 22 to the first expansion member 28 via the lines $L_4$ and $L_5$. When it flows through the expansion member 28, the refrigerant expands and is supplied via the line $L_6$ to the evaporator 14 in which the refrigerant evaporates and heat is thus extracted from the air to be cooled. Via a line $L_7$, the refrigerant is led back to the compressor 24 via the refrigerant collector 26. In order to increase capacity, heat exchange between a high-pressure-side section (line $L_5$) and a low-pressure-side section (line $L_7$) takes place in an internal heat exchanger 42, in the present instance heat being transferred from the high-pressure-side section to the low-pressure-side section.

In the cooling mode, the heating heat exchanger 16 is inoperative, and the refrigerant is led via the line $L_2$ to the latter and is let past the second expansion member 30, so that the line $L_2$ is used as a heating bypass line.

Figure 2:
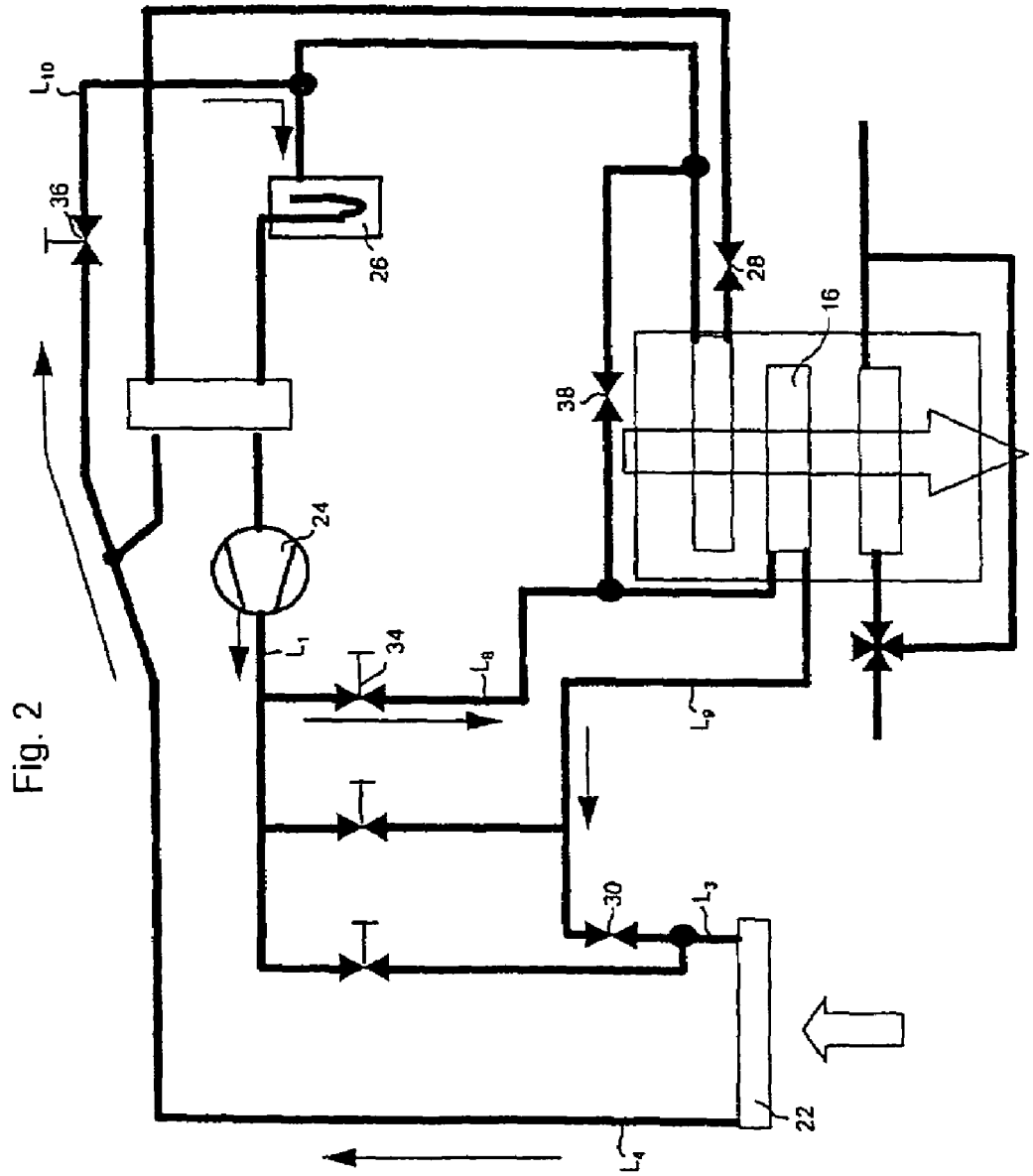
FIG. 2 shows the heating/cooling circuit according to the invention in the heating operating mode.

In the heating mode (FIG. 2) where the air to be supplied to the vehicle interior is solely to be heated, the evaporator 14 is inoperative and the heating heat exchanger 16 is operative. The heating/cooling circuit 10 then operates as a heat pump. The refrigerant is supplied as hot gas from the compressor 24 via the lines $L_1$ and $L_8$ to the heating heat exchanger 16, in which the refrigerant discharges heat and at the same time heats the supply air. The refrigerant is supplied via a line $L_9$ to the second expansion member 30 and is expanded there. The refrigerant is supplied via a line $L_3$ to the exterior heat exchanger 22 which can then be operated as an evaporator in which the refrigerant evaporates and extracts heat from the exterior air. The refrigerant is supplied to the compressor 24 again via lines $L_4$, $L_{10}$ (and, if appropriate, to a small extent $L_7$). The line $L_{10}$, which can be shut off via a valve 36, serves, in the heating mode, as a cooling bypass line for the refrigerant-side bypass of the evaporator 14. The internal heat exchanger 42 does not function in the heating mode.

In addition, in the heating mode, the further heating heat exchanger 20 can be operated by a heating regulating valve 40 being opened correspondingly, so that hot coolant can flow from the engine to the heating heat exchanger 20.

Figure 3:
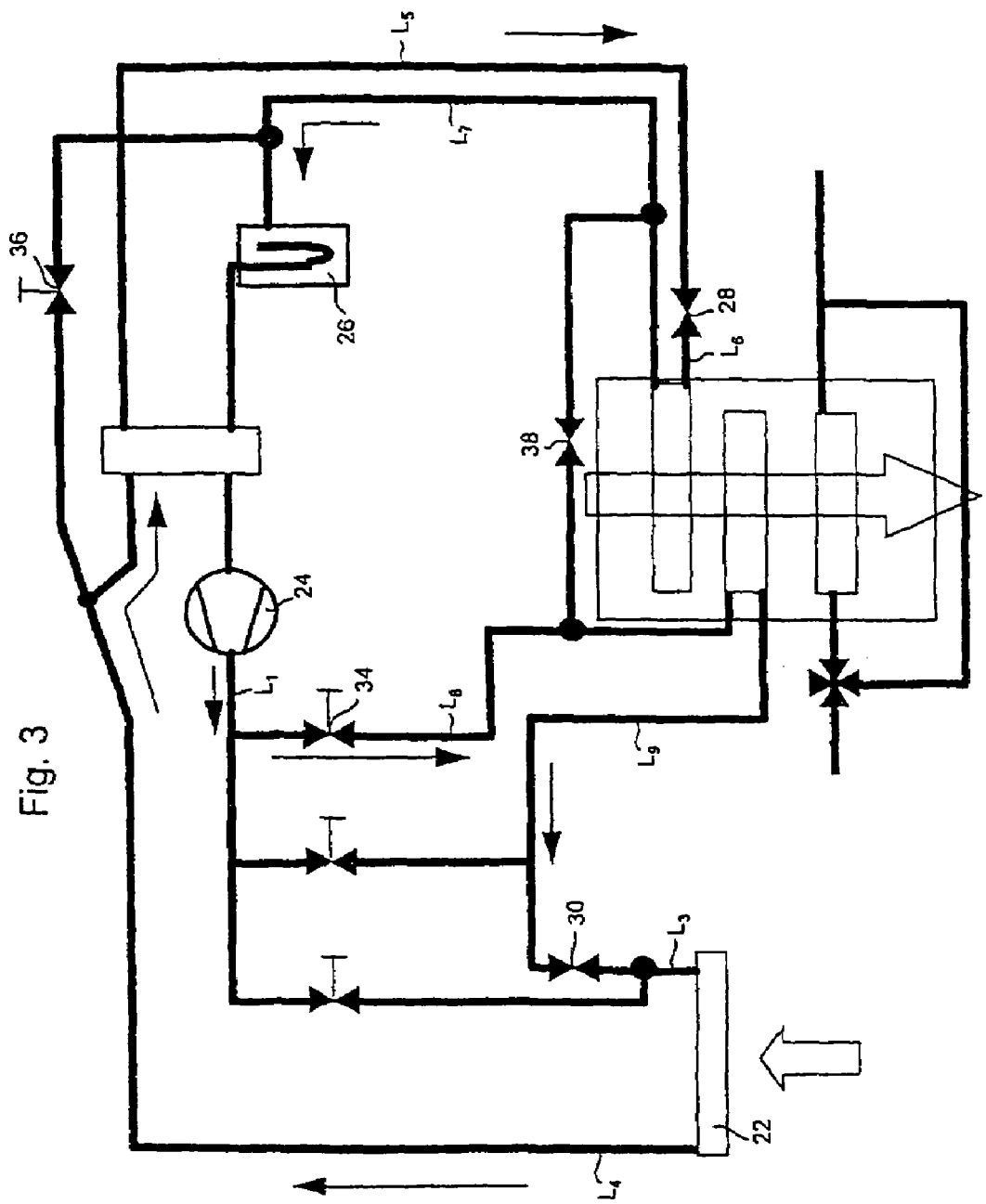
FIG. 3 shows the heating/cooling circuit according to the invention in the reheat operating mode.
Figure 4:
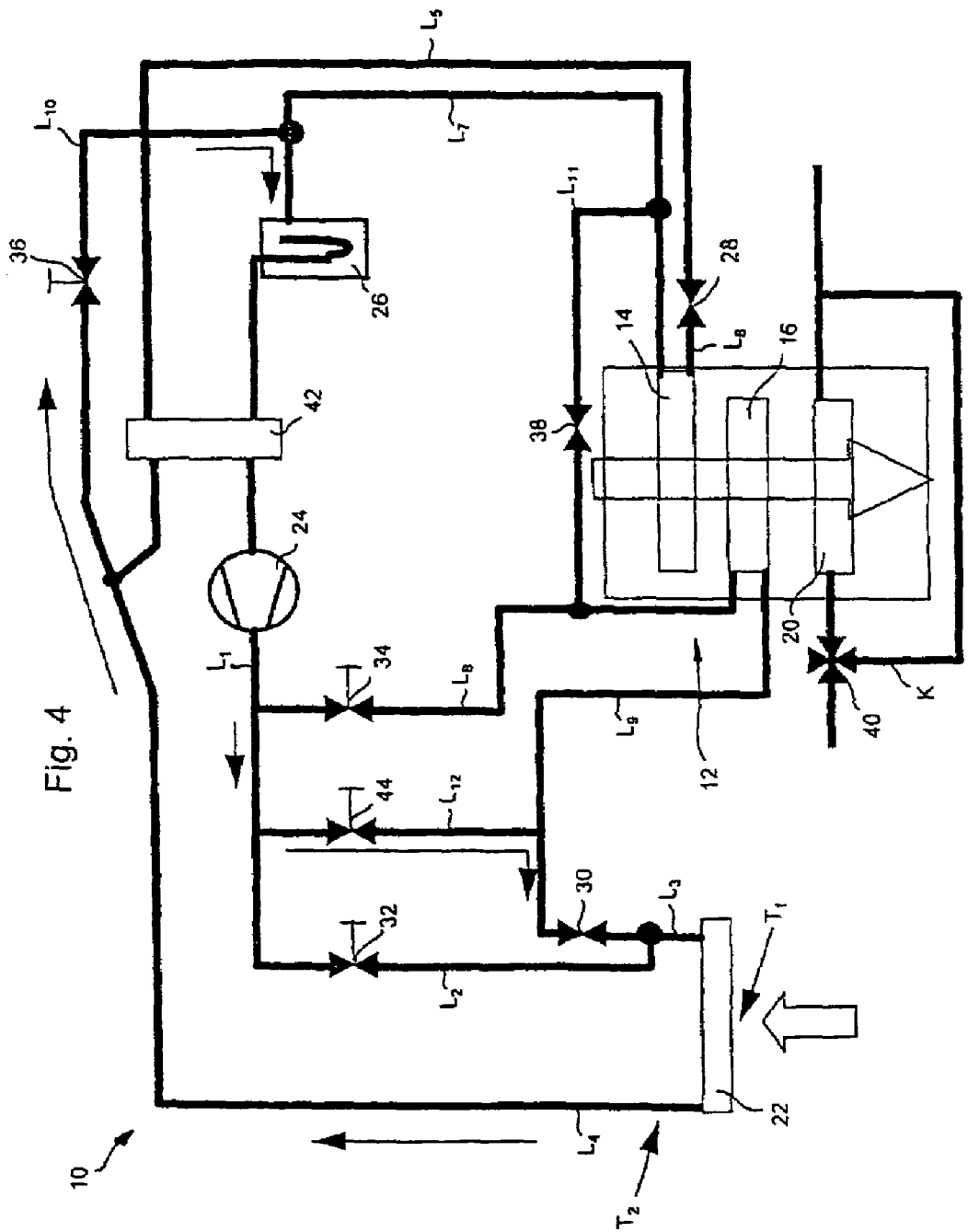
FIG. 4 shows the heating/cooling circuit according to the invention in the defrosting operating mode.

In the reheat mode (FIG. 3), which serves for dehumidifying and heating the air to be supplied to the vehicle interior, both the evaporator 14 and the heating heat exchanger 16 are operative, so that the air can first cool in the evaporator 14 and the moisture contained in the air can condense out. Before the air is supplied to the vehicle interior, it can be heated again in the heating heat exchanger 16 and optionally also in the further heating heat exchanger 20.

In the reheat mode, the refrigerant is supplied from the compressor 24 to the heating heat exchanger 16 via the lines $L_1$ and $L_8$, so that, in the heating heat exchanger 16, the refrigerant can discharge heat into the air. The refrigerant is led to the expansion member 30 via the line $L_9$. Depending on the setting of the expansion member 30, said refrigerant can pass without any appreciable pressure loss or else be throttled to an advantageous pressure. The refrigerant is led to the exterior heat exchanger 22 via the line $L_3$. Depending on the setting of the intermediate pressure, in the exterior heat exchanger 22 the refrigerant extracts heat from the exterior air or discharges heat into the exterior air. From the exterior heat exchanger 22, the refrigerant is supplied to the expansion member 28 via the lines $L_4$, $L_5$ and to the evaporator 14 via the line $L_6$. The refrigerant is returned to the compressor 24 again from the evaporator 14 via the lines $L_7$.

Depending on the moisture content and temperature of the air, a specific cooling capacity at the evaporator 14 is required for the desired dehumidification. Furthermore, depending on whether the interior of a vehicle is still cold at the start of a trip or has already heated up during the trip, a widely differing heating capacity is required for the subsequent heating of the air to a comfortable level. By the variation of the expansion members 28, 30, the pressure in the exterior heat exchanger 22 can be set ideally between the pressure at the evaporator 14 and the high pressure at the heating heat exchanger 16, in which case it must be remembered that the high pressure of the heating heat exchanger 16 is dependent not only on the conveying volume of the compressor 24, but, in particular, on the position of the expansion members 28 and 30 and must be set to a value advantageous for the corresponding boundary conditions. The expansion members 28 and 30 therefore cannot be set independently of one another. If the pressure in the exterior heat exchanger is high, that is to say, the expansion member 30 is opened wide and the expansion member 28 is largely closed, the exterior heat exchanger discharges heat and the ratio between the heating capacity of the heat exchanger 16 and the cooling capacity of the evaporator 14 is low. Such a setting is therefore advantageous in the case of a low heating requirement.

If, by contrast, the expansion member 30 is increasingly closed and the expansion member 28 increasingly opened, the pressure in the exterior heat exchanger 22 becomes increasingly lower and the discharged heat capacity of the exterior heat exchanger 22 falls. This results in a falling specific refrigerating capacity in the evaporator 14. The ratio of the heating capacity in the heating heat exchanger 16 and refrigerating capacity in the evaporator 14 consequently rises.

When the pressure in the exterior heat exchanger 22 becomes so low that the boiling temperature of the refrigerant assigned to it undershoots the temperature of the exterior air, the exterior heat exchanger then acts as an evaporator and absorbs heat from the surroundings. This leads to a further reduction in the specific refrigerating capacity in the evaporator 14. The ratio of the heating capacity in the heating heat exchanger 16 and the refrigerating capacity in the evaporator 14 thus rises with the falling pressure in the exterior heat exchanger 22.

In order to match the available cooling and heating capacity to the current requirements, the expansion members 28 and 30 must be set in such a way that, on the one hand, a high pressure advantageous for the overall capacity is established at the heating heat exchanger 16 and, at the same time, a pressure level suitable for the ratio of the cooling capacity and the heating capacity prevails in the exterior heat exchanger 22. The overall capacity can be set via the conveying volume of the compressor 24 or else, within certain limits, via the selection of the pressure level in the heating heat exchanger 16.

Preferably, the second expansion member 30 can be shut off, so that, in the cooling mode, no refrigerant can pass from the line $L_3$ into the line $L_9$ and consequently into the heating heat exchanger 16. Alternatively, this shut-off may take place by means of a nonreturn valve or nonreturn flap arranged upstream or downstream of the expansion member 30.

Preferably, the first expansion member 28, too, can be shut off, so that, in the heating mode, no refrigerant can pass under high pressure from the line $L_5$ into the line $L_6$ and consequently into the evaporator 14.

When, in the cooling mode, only the evaporator 14 is operative, the air cooled in the evaporator 14 will cool the heating heat exchanger 16 which follows on the air side, with the result that it may happen that, in the course of time, refrigerant accumulates in the heating heat exchanger 16 and the refrigerant lines $L_8$ and $L_9$ and is then lacking in the remaining circuit. Moreover, the system being at a standstill, inadmissibly high pressures could occur in the heating heat exchanger 16 at high temperatures as a result of enclosed refrigerant. In order to avoid this accumulation, a line $L_{11}$ throttlable via a throttle 38 is provided, which makes a connection between a line, preferably the inflow line $L_8$, connected to the heating heat exchanger 16 and a line or component which is at a low system pressure, that is to say is located between the expansion member 28 and the inlet of the compressor 24. In the exemplary embodiment illustrated, this is a return line $L_7$ of the evaporator 14. This throttle 38 may be formed by a valve, as in the exemplary embodiment, a contraction in the line $L_{11}$ or capillary, a porous body or the like. In order to avoid an accumulation of refrigerant, the throttle 38 may have very small dimensioning, so that there is not appreciable influence on the further functioning of the circuit 10.

In a mode in which the ambient air serves as a heat source, that is to say when heat is absorbed from the ambient air in the exterior heat exchanger 22 (heating mode, partially also the reheat mode), there is the risk of icing-up of the exterior heat exchanger 22, since, due to the extraction of heat, atmospheric moisture, that is to say water, is precipitated on the exterior heat exchanger 22, said water freezing at temperatures below 0° C. and icing up the exterior heat exchanger 22. The airstream, indicated by an arrow in FIGS. 1 to 4, is thereby impeded when it flows through. Since this airstream also flows via the coolant cooler (not illustrated), which discharges the engine heat, a lack of action of air upon the coolant cooler, along with an unfavorable driving state (high load), may put the engine at risk due to overheating, and it is therefore necessary to monitor the state of the exterior heat exchanger 22. For this purpose, the temperature difference between the temperature $T_1$ of the air at the inlet and the temperature $T_2$ of the refrigerant at the outlet of the exterior heat exchanger 22 is determined. Icing-up occurs, that is to say a defrosting of the exterior heat exchanger 22 is necessary, when the temperature difference becomes too great. Conventional reference values for the temperature difference $T_1-T_2$ are 5 to 10 K for an ice-free exterior heat exchanger 22 and 10 to 20 K for an iced-up exterior heat exchanger 22, although there is dependence on the exterior temperature.

For the defrosting mode (FIG. 4), the heating/cooling circuit 10 can be operated in such a way that a discharge of heat takes place in the exterior heat exchanger 22, so that the ice which has formed is removed again.

In the defrosting mode, the refrigerant is led from the compressor 24 via the lines $L_1$ and $L_{12}$ to the expansion member 30 where it is expanded to a low pressure. Subsequently, it is supplied via the line $L_3$ to the exterior heat exchanger 22, in which it can discharge its heat, by means of which the ice can be melted and therefore removed. Via the lines $L_4$ and $L_{10}$, the refrigerant is led via the refrigerant collector 26 to the internal heat exchanger 42, inoperative in this operating mode, and the compressor 24.

In the defrosting mode, the valves 36 and 42 are open, while the valves 32 and 34 are closed. Furthermore, the first expansion member 28 is preferably closed and the second expansion member 30 is controlled.

The end of the defrosting operation can be determined as follows: the temperature $T_2$ of the refrigerant at the outlet of the exterior heat exchanger 22 is determined and is compared with a limit value. The limit value is conventionally around 5 to 10° C. If the limit value is overshot, the defrosting operation is concluded and the defrosting mode is terminated, so that there can be a changeover again to the heating mode or reheat mode.

According to the exemplary embodiment, the defrosting behavior is assisted in that, during the defrosting mode, the airstream flowing through the exterior heat exchanger 22 is minimized or completely prevented. In order to free the exterior heat exchanger of the melted ice, that is to say of the melt water, as quickly as possible, a large to preferably the maximum airstream is briefly conducted via the exterior heat exchanger 22 at the end of the defrosting mode, so that the melt water is blown out of the exterior heat exchanger 22 and premature renewed icing-up can be prevented.

Preferably, $CO_2$ is used as refrigerant, since $CO_2$ has good thermodynamic properties which make it suitable for a heat-pump mode. When $CO_2$ is used, for increase in capacity an internal heat exchanger 42 is provided, which brings about a heat exchange between a high-pressure-side section (line $L_5$) and a low-pressure-side section (line $L_7$).

The invention claimed is:

1. A heating/cooling circuit for a motor vehicle, comprising:

(a) an evaporator for the cooling of air to be supplied to an interior of the motor vehicle,
 (b) a heating heat exchanger for heating the air to be supplied to the interior of the motor vehicle,
 (c) an exterior heat exchanger, with a compressor for conveyance of refrigerant,
 (d) a first expansion member which is assigned to the evaporator,
 (e) a second expansion member which is assigned to the exterior heat exchanger, and
 (f) refrigerant lines, via which the abovementioned components are connected to one another, wherein a defrosting connection of the circuit comprises the compressor, a single operable heat exchanger and the second expansion member, and wherein the single operable heat exchanger is the exterior heat exchanger.

2. The heating/cooling circuit as claimed in claim 1, wherein the second expansion member follows the compressor.

3. The heating/cooling circuit as claimed in claim 1, wherein the second expansion member precedes the exterior heat exchanger.

4. The heating/cooling circuit as claimed in claim 1, wherein the second expansion member is controllable.

5. The heating/cooling circuit as claimed in claim 1, wherein the power of the compressor is controllable.

6. The heating/cooling circuit as claimed in claim 1, wherein a sensor is provided in the air upstream of the exterior heat exchanger.

7. The heating/cooling circuit as claimed in claim 1, wherein a sensor is provided in the refrigerant downstream of the exterior heat exchanger.

8. The heating/cooling circuit as claimed in claim 1, wherein a sensor is provided in the air upstream of the exterior heat exchanger or in the refrigerant downstream of the exterior heat exchanger and wherein the sensor is a temperature sensor.

9. The heating/cooling circuit as claimed in claim 7, wherein the sensor is a pressure sensor which is arranged on the low-pressure side downstream of the exterior heat exchanger.

10. The heating/cooling circuit as claimed in claim 1, further comprising sensors and a control device, which controls the heating/cooling circuit as a function of the data determined by means of the sensors.

11. The heating/cooling circuit as claimed in claim 1, further comprising $CO_2$ refrigerant.

12. The heating/cooling circuit as claimed in claim 1, further comprising a cooling bypass line, capable of being shut off, for the refrigerant-side bypass of the evaporator and of the first expansion member.

13. An air-conditioning system of a motor vehicle comprising a heating/cooling circuit as claimed in claim 1.

14. A method for controlling an air-conditioning system having a heating/cooling circuit comprising a defrosting connection according to claim 1, the method comprising, in a defrosting mode:

heating the exterior heat exchanger with the circulating refrigerant;
 compressing the refrigerant in the compressor;
 conducting the refrigerant to the expansion member;
 expanding the refrigerant at the expansion member; and
 discharging its heat in the exterior heat exchanger, the heat melting ice which is located on and/or in the exterior heat exchanger.

15. The method as claimed in claim 14, further comprising determining a temperature difference ($T_1-T_2$) between a temperature ($T_1$) of the air and a temperature ($T_2$) of the refrigerant at the outlet of the exterior heat exchanger is determined and comparing the temperature difference ($T_1-T_2$) with a threshold value for the temperature difference.

16. The method as claimed in claim 15, further comprising switching the air-conditioning system to the defrosting mode if the threshold value for the temperature difference ($T_1-T_2$) is overshot.

17. The method as claimed in claim 14, further comprising determining, during the defrosting mode, a temperature ($T_2$) of the refrigerant at the outlet of the exterior heat exchanger and comparing the temperature ($T_2$) with a threshold value for the temperature ($T_2$) of the refrigerant at the outlet of the exterior heat exchanger, and terminating the defrosting mode, when the threshold value is overshot.

18. The method as claimed in claim 14, further comprising, during the defrosting mode, conducting no or only minimal air via the exterior heat exchanger.

19. The method as claimed in claim 14, further comprising, during or after the termination of the defrosting mode, conducting a large to maximum airstream via the heat exchanger.

20. The heating/cooling circuit as claimed in claim 1, wherein the defrosting connection further comprises a refrigerant bypass line which bypasses a further heat exchanger thereby rendering the further heat exchanger inoperable.

21. A motor vehicle comprising an air-conditioning system according to claim 13.

22. A heating/cooling circuit for a motor vehicle, comprising:
   (a) an evaporator for the cooling of air to be supplied to an interior of the motor vehicle,
   (b) a heating heat exchanger for heating the air to be supplied to the interior of the motor vehicle,
   (c) an exterior heat exchanger, with a compressor for conveyance of refrigerant,
   (d) a first expansion member which is assigned to the evaporator,
   (e) a second expansion member which is assigned to the exterior heat exchanger, and
   (f) refrigerant lines, via which the abovementioned components are connected to one another,
wherein a defrosting connection of the circuit comprises the compressor, the exterior heat exchanger and the second expansion member, and
wherein the heating/cooling circuit further comprises a heating bypass line, capable of being shut off, for the refrigerant-side bypass of the heating heat exchanger.

23. A heating/cooling circuit for a motor vehicle, comprising:
   (a) an evaporator for the cooling of air to be supplied to an interior of the motor vehicle,
   (b) a heating heat exchanger for heating the air to be supplied to the interior of the motor vehicle,
   (c) an exterior heat exchanger, with a compressor for conveyance of refrigerant,
   (d) a first expansion member which is assigned to the evaporator,
   (e) a second expansion member which is assigned to the exterior heat exchanger, and
   (f) refrigerant lines, via which the abovementioned components are connected to one another,
wherein a defrosting connection of the circuit comprises the compressor, the exterior heat exchanger and the second expansion member, and
wherein the heating/cooling circuit further comprises a heating bypass line, capable of being shut off, for the refrigerant-side bypass of the heating heat exchanger and of the second expansion member.

24. A heating/cooling circuit for a motor vehicle, comprising:
   (a) an evaporator for the cooling of air to be supplied to an interior of the motor vehicle,
   (b) a heating heat exchanger for heating the air to be supplied to the interior of the motor vehicle,
   (c) an exterior heat exchanger, with a compressor for conveyance of refrigerant,
   (d) a first expansion member which is assigned to the evaporator,
   (e) a second expansion member which is assigned to the exterior heat exchanger, and
   (f) refrigerant lines, via which the abovementioned components are connected to one another,
wherein a defrosting connection of the circuit comprises the compressor, the exterior heat exchanger and the second expansion member, and
wherein the heating/cooling circuit further comprises a throttlable line between a connecting line to the heating heat exchanger and a line or component at a low system pressure.

* * * * *